(12) United States Patent
Wadekar et al.

(10) Patent No.: US 8,138,806 B2
(45) Date of Patent: Mar. 20, 2012

(54) DRIVER CIRCUIT FOR HIGH VOLTAGE DIFFERENTIAL SIGNALING

(75) Inventors: Jayesh Gangaprasad Wadekar, Bangalore (IN); Sumantra Seth, Bangalore (IN); Kartik Reddy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/690,115

(22) Filed: Jan. 20, 2010

(65) Prior Publication Data

US 2011/0175649 A1    Jul. 21, 2011

(51) Int. Cl.
*H03B 1/00* (2006.01)
*H03K 3/00* (2006.01)

(52) U.S. Cl. ......... 327/112; 327/108; 327/109; 327/333

(58) Field of Classification Search ............... 327/108, 327/111, 112
See application file for complete search history.

(56) References Cited

U.S. PATENT DOCUMENTS

| 5,539,334 A | 7/1996 | Clapp, III et al. |
| 7,474,131 B1 * | 1/2009 | Hoffmann et al. ............ 327/108 |

\* cited by examiner

*Primary Examiner* — Lincoln Donovan
*Assistant Examiner* — John Poos
(74) *Attorney, Agent, or Firm* — Wade J. Brady, III; Frederick J. Telecky, Jr.

(57) ABSTRACT

Driver circuit for high voltage differential signaling. The circuit includes a first positive driver that generates a first positive transition at a first output in response to an input. The circuit also includes a first current element coupled to the first positive driver to enable generation of a current. Further, the circuit includes a first negative driver coupled to the first current element, and responsive to the input and the current, due to the first current element, to generate a first negative transition, at a second output, at a rate similar to that of the first positive transition.

21 Claims, 6 Drawing Sheets

DRIVER CIRCUIT FOR HIGH VOLTAGE DIFFERENTIAL SIGNALING

TECHNICAL FIELD

Embodiments of the disclosure relate to driver circuits for high voltage differential signaling.

BACKGROUND

Differential signaling is used in various applications, for example for driving universal serial bus (USB). Transmission speed of data can vary across the applications and also within an application. For example, for USB, transmission speeds of 12 Mbps and 1.5 Mbps are desired. In low speed transmission mode meeting requirements of differential signaling is a challenge as load due to a USB cable varies. The requirements include controlling slew rate at two outputs, controlling rise time and fall time ratio at the two outputs within a certain range, and controlling start time of a rising edge and a falling edge at the two outputs for meeting requirements of cross-over voltage. The two outputs are differential to each other and include a positive transition and a negative transition.

A circuit 100 for differential signaling, is illustrated in FIG. 1 (Prior Art). When a driver 105 is active then the positive transition is obtained at an output node 110 and when a driver 115 is active then the negative transition is obtained at the output node 110. The driver 105 generates the positive transition in response to a pre-driver circuit 125 and an input at an input node 120, and the driver 115 generates the negative transition in response to a pre-driver circuit 130 and another input at the input node 120. Two instances of the circuit 100, one instance generating the positive transition and another instance generating the negative transition independently, together forms a pseudo-differential driver. In the illustrated example, the driver 105 of the first instance of the circuit 100 is active and a driver similar to the driver 115 of a second instance is active to provide the two outputs. Slew rates at the two outputs are given by:

$$\frac{In}{Cf + Cgdn} \ldots \text{falling transition slew rate} \quad (1)$$

$$\frac{Ip}{Cf + Cgdp} \ldots \text{rising transition slew rate} \quad (2)$$

where In is a source current of the second instance, Ip is a sink current of the first instance, Cf is capacitance of feedback capacitors 135, Cgdn is gate to drain capacitance of the driver similar to the driver 115, and Cgdp is gate to drain capacitance of the driver 105.

It is desired to have similar slew rates at the two outputs to achieve a desired cross over point of the two outputs. However, formula 1 and formula 2 illustrates that the slew rates of rising transition of one instance is different from that of falling transition of other instance and vice-versa. In order to have similar slew rates "In" needs to be equal to "Ip". "In" can be matched to "Ip" using various current-mirroring techniques but at expense of additional area or power. Also, current-mirroring techniques result in mismatches that worsen with process-scaling. Further, Cgdn and Cgdp cause mismatch in the fall time and the rise time at the two outputs. In order to have mismatch between Cgdn and Cgdp, insignificant, Cf can be made larger but at the expense of additional area. Also, the start time of the rising edge and the falling edge at the two outputs depends on parasitic capacitances at a gate of the driver 105 and at a gate of the driver similar to the driver 115, respectively and is uncontrolled causing additional variation of the cross-over voltage from an expected value.

SUMMARY

An example of a circuit includes a first positive driver that generates a first positive transition at a first output in response to an input. The circuit also includes a first current element coupled to the first positive driver to enable generation of a current. Further, the circuit includes a first negative driver coupled to the first current element, and responsive to the input and the current, due to the first current element, to generate a first negative transition, at a second output, at a rate similar to that of the first positive transition.

An example of a driver circuit for generating a transition at an output includes a first feedback capacitor coupled to a load. The driver circuit also includes a first driver transistor having gate coupled to the first feedback capacitor and pre-biased at a first predefined voltage to control slew rate at the output at start of a first transition in response to a first input. Further, the driver circuit includes a first transistor coupled between the first feedback capacitor and drain of the first driver transistor in a cascode connection and biased at a second predefined voltage to isolate a first feedback capacitance of the first driver transistor, due to the first feedback capacitor, from gate-to-drain capacitance of the first driver transistor and to prevent voltage at a drain of the first driver transistor from exceeding a first predefined value. Moreover, the driver circuit includes a first switch coupled to source of the first driver transistor and responsive to a first control signal to render the first driver transistor to generate the first transition at the output. The driver circuit also includes a second feedback capacitor coupled to the load. Further, the driver circuit includes a second driver transistor having gate coupled to the second feedback capacitor and biased at a third predefined voltage to control slew rate at the output at start of a second transition in response to a second input. Moreover, the driver circuit includes a second transistor coupled between the second feedback capacitor and drain of the second driver transistor in a cascode connection and biased at a fourth predefined voltage to isolate a second feedback capacitance of the second driver transistor, due to the second feedback capacitor, from gate-to-drain capacitance of the second driver transistor and to prevent voltage at a drain of the second driver transistor from exceeding a second predefined value. The driver circuit also includes a second switch coupled to source of the second driver transistor and responsive to a second control signal to render the second driver transistor to generate the second transition at the output.

An example of a method for controlling slew rate in a driver circuit includes pre-charging a first driver to a first predefined voltage and a second driver to a second predefined voltage. The method also includes driving a current through the first driver and the second driver. Further, the method includes generating a first output, by the first driver, and a second output, by the second driver, in response to an input, the second output having a slew rate equivalent to that of the first output.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the disclosure.

DETAILED DESCRIPTION OF THE EMBODIMENTS

Figure 1:
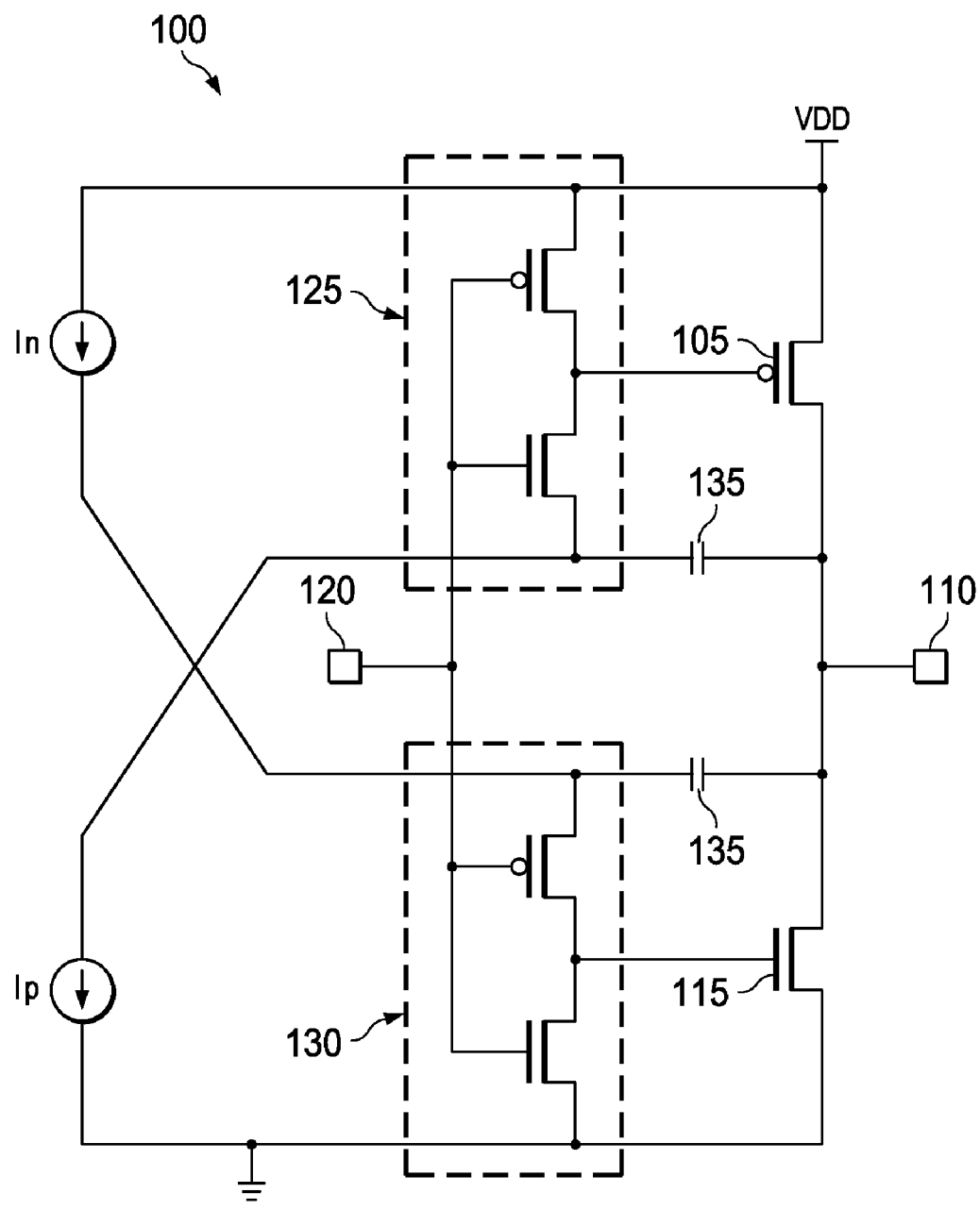
FIG. 1 illustrates a circuit for differential signaling, in accordance with prior art.
Figure 2:
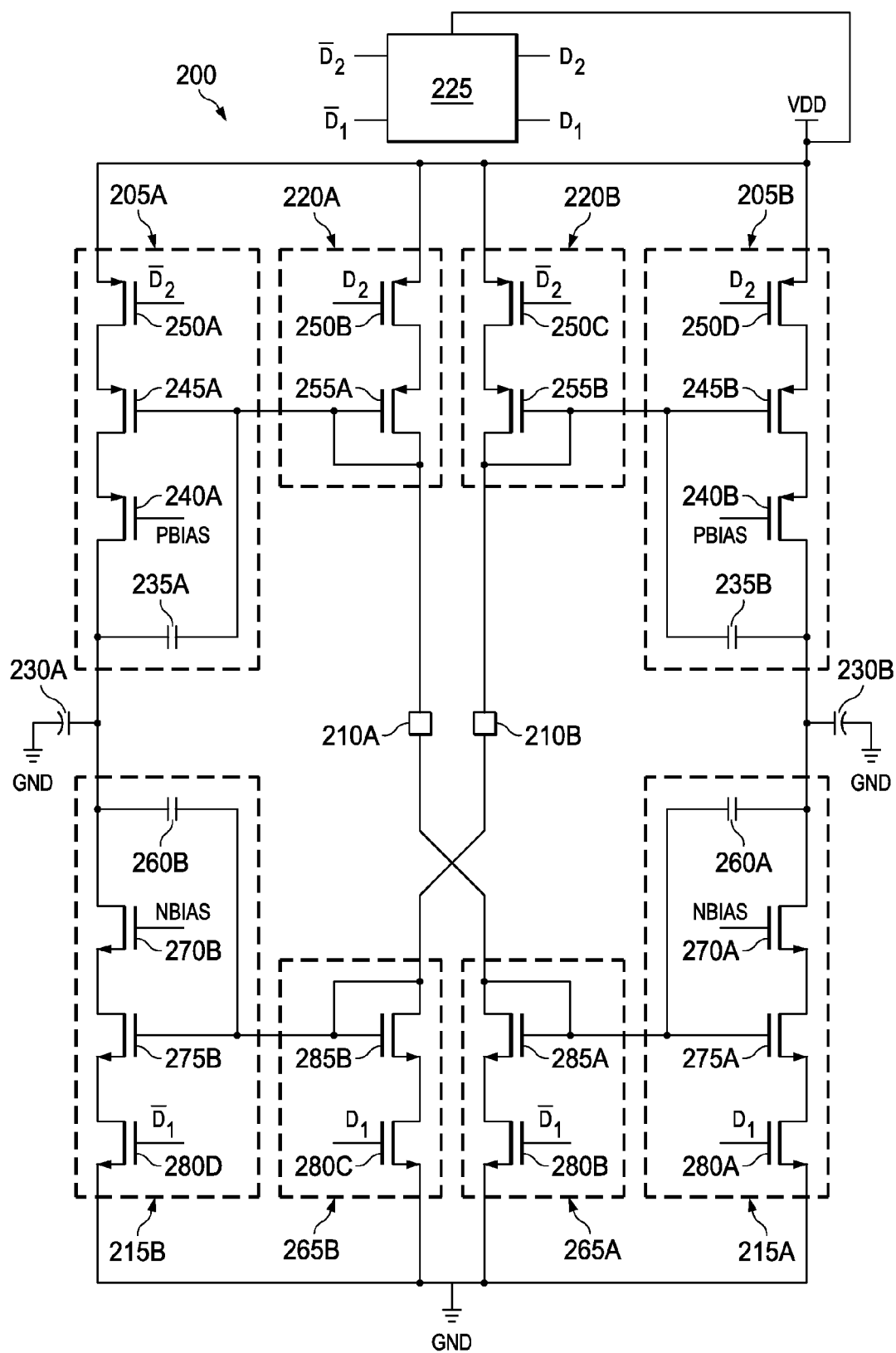
FIG. 2 illustrates a circuit, in accordance with one embodiment.

Referring to FIG. 2, the circuit 200 includes a first positive driver 205A, hereinafter referred to as the positive driver 205A, coupled to a first current element 210A, hereinafter referred to as the current element 210A. The current element 210A is coupled to a first negative driver 215A, hereinafter referred to as the negative driver 215A. The circuit 200 also includes a second positive driver 205B, hereinafter referred to as the positive driver 205B, coupled to a second current element 210B, hereinafter referred to as the current element 210B. The current element 210B is coupled to a second negative driver 215B, hereinafter referred to as the negative driver 215B. Each driver is coupled to a biasing circuit. For example, the positive driver 205A is coupled to a biasing circuit 220A, the positive driver 205B is coupled to a biasing circuit 220B, the negative driver 215A is coupled to a biasing circuit 265A and the negative driver 215B is coupled to a biasing circuit 265B. Each driver is also coupled to a load. For example, the positive driver 205A and the negative driver 215B are coupled to a load 230A, and the positive driver 205B and the negative driver 215A are coupled to a load 230B.

The positive driver 205A includes a feedback capacitor 235A, hereinafter referred to as the capacitor 235A. One terminal of the capacitor 235A is coupled to the load 230A and a drain of a transistor 240A, and other terminal is coupled to a gate of a driver transistor 245A. The transistor 240A is coupled to a driver transistor 245A in a cascode connection. A source of the transistor 240A is coupled to a drain of the driver transistor 245A. A source of the driver transistor 245A is coupled to a switch 250A, for example a transistor. A source of the switch 250A is coupled to a power supply (VDD). A gate of the driver transistor 245A is coupled to the biasing circuit 220A. The biasing circuit 220A includes a diode 255A coupled to a switch 250B, for example a transistor. The switch 250B is coupled to the power supply. The diode 255A is coupled to the current element 210A.

The negative driver 215A includes a feedback capacitor 260A, hereinafter referred to as the capacitor 260A. One terminal of the capacitor 260A is coupled to the load 230B and a drain of a transistor 270A, and other terminal is coupled to a gate of a driver transistor 275A. The transistor 270A is coupled to a driver transistor 275A in the cascode connection. A source of the transistor 270A is coupled to a drain of the driver transistor 275A. A source of the driver transistor 275A is coupled to a switch 280A, for example a transistor. A source of the switch 280A is coupled to a ground (GND). A gate of the driver transistor 275A is coupled to the biasing circuit 265A. The biasing circuit 265A includes a diode 285A coupled to a switch 280B, for example a transistor. The switch 280B is coupled to the ground. The diode 285A is coupled to the current element 210A.

The positive driver 205B includes a feedback capacitor 235B, hereinafter referred to as the capacitor 235B. One terminal of the capacitor 235B is coupled to the load 230B and a drain of a transistor 240B, and other terminal is coupled to a gate of a driver transistor 245B. The transistor 240B is coupled to a driver transistor 245B in the cascode connection. A source of the transistor 240B is coupled to a drain of the driver transistor 245B. A source of the driver transistor 245B is coupled to a switch 250D, for example a transistor. A source of the switch 250D is coupled to the power supply. A gate of the driver transistor 245B is coupled to the biasing circuit 220B. The biasing circuit 220B includes a diode 255B coupled to a switch 250C, for example a transistor. The switch 250C is coupled to the power supply. The diode 255B is coupled to the current element 210B.

The negative driver 215B includes a feedback capacitor 260B, hereinafter referred to as the capacitor 260B. One terminal of the capacitor 260B is coupled to the load 230A and a drain of a transistor 270B, and other terminal is coupled to a gate of a driver transistor 275B. The transistor 270B is coupled to a driver transistor 275B in the cascode connection. A source of the transistor 270B is coupled to a drain of the driver transistor 275B. A source of the driver transistor 275B is coupled to a switch 280D, for example a transistor. A source of the switch 280D is coupled to the ground. A gate of the driver transistor 275B is coupled to the biasing circuit 265B. The biasing circuit 265B includes a diode 285B coupled to a switch 280C, for example a transistor. The switch 280C is coupled to the ground. The diode 285B is coupled to the current element 210B.

The circuit 200 can also include a level-shifter circuit and a pre-driver circuit. The level-shifter circuit and the pre-driver circuit can together be referred to as a circuit 225 which is coupled to each switch.

The capacitor 235A, the capacitor 235B, the capacitor 260A and the capacitor 260B are identical having similar capacitances. In some embodiments, the capacitor 235A, the capacitor 235B, the capacitor 260A and the capacitor 260B can have different capacitances based on application requirement.

The driver transistor 245A, the driver transistor 245B, the transistor 240A, and the transistor 240B are positive metal oxide semiconductor (PMOS) type transistors. The switch 250A, the switch 250B, the switch 250C and the switch 250D are also PMOS type transistors. The diode 255A and the diode 255B are PMOS type diodes. The driver transistor 275A, the driver transistor 275B, the transistor 270A, and the transistor 270B are negative metal oxide semiconductor (NMOS) type transistors. The switch 280A, the switch 280B, the switch 280C and the switch 280D are also NMOS type transistors. The diode 285A and the diode 285B are NMOS type diodes. The driver transistor 245A, the driver transistor 245B, the driver transistor 275A, the driver transistor 275B, the switch 250A, the switch 250B, the switch 250C, the switch 250D, the switch 280A, the switch 280B, the switch 280C and the switch 280D are thin-gate oxide transistors. The thin-gate oxide transistors help in having higher gain and optimize area. The transistor 240A, the transistor 240B, the transistor 270A, and the transistor 270B are thick-gate oxide transistors to reliably accept high output voltage. The choice for size of the transistors can depend on the output voltage swing and speed requirement.

Examples of current elements include, but are not limited to, resistors and current sources. Various circuits, for example a circuit described in U.S. Pat. No. 5,539,334, entitled "Method and apparatus for high voltage level shifting" and assigned to Texas Instruments Incorporated, which is incorporated herein by reference in its entirety, can be used as the circuit 225. Each feedback capacitor can include one or more metal oxide capacitors. Other types of capacitors, for example Nwell capacitors, ceramic capacitors, air gap capacitors, vacuum capacitors, dielectric capacitors and film capacitors can also be used. Each load can be a matched capacitive load.

In some embodiments, each capacitor can be a stack of capacitors.

The circuit 200 can be used as a driver circuit for signaling, for example high voltage differential signaling. The driver circuit can also be used for driving a load. For example, the circuit 200 can be used for driving a universal serial bus (USB) cable. The circuit 200 can also be used in ultra-deep-sub-micron (UDSM) process devices.

The circuit 200 provides two outputs in response to an input. The two outputs are differential to each other and include opposite transitions. The input can be different for different drivers and can be obtained from the circuit 225. The two outputs are obtained across the load 230A and the load 230B. Output across any of the load 230A or the load 230B can be referred to as a first output or a second output. In one aspect, the two outputs include a first positive transition (rising edge) at the first output and a first negative transition (falling edge) at the second output. In another aspect, the two outputs include a second negative transition at the first output and a second positive transition at the second output. For example, a positive transition can be obtained across the load 230A when the driver 205A is active and the driver 215B is inactive, and a negative transition can be obtained across the load 230B when the driver 215A is active and the driver 205B is inactive. Similarly, the positive transition can be obtained across the load 230B when the driver 205B is active and the driver 215A is inactive, and a negative transition can be obtained across the load 230A when the driver 215B is active and the driver 205A is inactive.

The working of the circuit 200 to generate the positive transition across the load 230A and to generate the negative transition across the load 230B is explained as follows:

D2 and D2' signals are level shifted versions of input signals D1 and D1', respectively. The input signals can also be referred to as input data signals. D2 and D2' drive p-channel switches, for example the switch 250A, the switch 250B, the switch 250C and the switch 250D. D1 and D1' drive n-channel switches, for example the switch 280A, the switch 280B, the switch 280C and the switch 280D. In one example, initially, D1 and D2 are at logic level LO. The output voltage across the load 230A is at low voltage, for example 0 volts (V), and the output across the load 230B is at high voltage, for example 3.3 V. The switch 250B, the diode 255A, the switch 280B and the diode 285A are active to pre-bias the gate of the driver transistor 245A and the gate of the driver transistor 275A at respective predefined voltages (first predefined voltage). The predefined voltages can be in proximity to threshold voltages of respective driver transistors. The transistor 240A and the transistor 270A are also adaptively biased using PBIAS signal and NBIAS signal respectively, based on the respective threshold voltages (second predefined voltage) to shield the transistor 240A and the transistor 270A from voltages across corresponding loads and to prevent the drain of corresponding driver transistors from crossing maximum allowable voltage limited by gate-oxide reliability limits. The switch 250A and the switch 280A are inactive.

D1 toggles from logic level LO to logic level HI (first control signal). D2 is also at logic level HI. The toggling can be referred to as the input to the driver transistor 245A and the driver transistor 275A. The switch 250B and the switch 280B then become inactive. The switch 250A and the switch 280A become active. An active path including the switch 250A, the driver transistor 245A and the transistor 240A generates the positive transition across the load 230A. Similarly, another active path including the switch 280A, the driver transistor 275A and the transistor 270A generates the negative transition across the load 230B.

Since the driver transistor 245A and the driver transistor 275A are pre-biased to the respective threshold voltages, the positive transition across the load 230A and the negative transition across the load 230B start with controlled and proportional slew rates with minimal delay. The pre-biasing can reduce dependence of start time of transitions on threshold voltages of n-channel driver transistors, for example the driver transistor 275A and of p-channel driver transistors, for example the driver transistor 245A. The pre-biasing can improve cross-over voltage by reducing the dependence and also can help in starting transition loop with high gain. In one example, the transition loop can be referred to as the positive driver 205A, when transition takes place from the positive driver 205B to the positive driver 205A. Similarly, in the illustrated example, the negative driver 215A can be referred to as the transition loop. Delay in start time of transitions can be due to the time taken by the gate of the driver transistor 245A and the gate of the driver transistor 275A to incrementally settle to an over-drive voltage ∈p and ∈n, respectively, to produce required slew rate at the output across the load 230A and at the output across the load 230B. The required over-drive voltage can be a function of the output across the load 230A and of the output across the load 230B. Therefore, settling of the gate of the driver transistor 245A and the gate of the driver transistor 275A depends on respective loads, strength of respective current elements, and parasitic capacitances at the respective gates of the driver transistors. For example, the driver transistor 245A may have an offset ∈p and hence can start generation of the positive transition when the voltage at the gate reaches the threshold voltage +∈p, where ∈p is negative. Similarly, the driver transistor 275A can start generation of the negative transition at the threshold voltage +∈n.

The rate of a transition at an output can be referred to as a slew rate. The slew rate across the capacitor 230A can be determined as $$\frac{I_{s1}}{C_f} \quad (3)$$

where Is1 is a current flowing through the capacitor 235A and Cf is the capacitance of the capacitor 235A.

Similarly, the slew rate across the capacitor 230B can be determined as $$\frac{I_{s2}}{C_f} \quad (4)$$

where Is2 is a current flowing through the capacitor 260A and Cf is the capacitance of the capacitor 260A.

Since the driver 205A and the driver 215A are cross coupled Is1 is equivalent to Is2. Is1 and Is2 can be denoted as Is. Is flows through the capacitor 235A, the current element 210A and the capacitor 260A. The current element 210A enables generation of Is in conjunction with the capacitor 235A and the capacitor 260A when the switch 250A and the switch 280A are active. Is can also depend on various other factors as illustrated in equations below. The slew rate across the capacitor 230A and across the capacitor 230B can be determined as $$\frac{Is}{Cf} \quad (5)$$

where Is is given by $$Is = (Io + I\delta) - \sqrt{(Io + I\delta)^2 - Io^2} \quad (6)$$

where Io and Iδ are given by $$Io = \frac{(VDD - Vtn - Vtp)}{R} \quad (7)$$

$$I\delta = \frac{C1}{KpnCfR^2} \quad (8)$$

where VDD is the power supply, Vtn is the threshold voltage of the driver transistor 275A, Vtp is the threshold voltage of the driver transistor 245A, R is the resistance of the current element 210A, C1 is the capacitance of the load 230A and the load 230B, and Kpn is given by $$\frac{1}{\sqrt{Kpn}} = \frac{1}{\sqrt{Kp}} + \frac{1}{\sqrt{Kn}} \quad (9)$$

where Kp and Kn are strengths of the driver transistor 245A and the driver transistor 275A respectively.

The coupling of the positive driver 205A to the negative driver 215A through the current element 210A and the coupling of the positive driver 205B to the negative driver 215B through the current element 210B can be referred to as cross-coupling. The cross-coupling with negative feedback due to the capacitors helps in achieving similar slew rates at the two outputs and also to have low sensitivity for process, supply voltage and temperature variations. Further, second order dependence of slew rates on the load 230A and the load 230B, as illustrated in equations 5, 6, and 8, can further be reduced by increasing Kpn, which is combined strength of the driver transistor 245A and the driver transistor 275A. Also, the ratio of time (rise time) elapsed in generating the positive transition and time (fall time) elapsed in generating the negative transition is within a desired range, for example close to unity, due to the cross-coupling. The cross-over voltage is also maintained within a desired range, for example around mid point (1.65 V) of the power supply and the ground, due to the cross-coupling through the current element 210A and the current element 210B.

In some embodiments, the current element 210A can be matched to the current element 210B, and the matching helps in achieving similar slew rates at the two outputs and desired ratio of the rise time and the fall time in subsequent transitions. The negative transition across the load 230B followed by the positive transition across the load 230B, and the positive transition across the load 230A followed by the negative transition across the load 230B can together be referred to as the subsequent transitions across each load. The matching also helps in achieving similar start time of the positive transitions and the negative transitions. Since the start time can be made similar for the positive transitions and the negative transitions, through current in the two outputs can also be minimized. The minimization of the through current in turn reduces sudden bounce at the power supply and the ground, and hence improves performance.

The driver transistor 245A and the switch 250A are stacked which helps in reducing supply leakage. Similarly, the driver transistor 275A and the switch 280A are also stacked to reduce leakage.

The transistor 240A can also be referred to as a common gate stage transistor. The transistor 240A isolates the driver transistor 245A from the output across the load 230A and acts as a common gate stage transistor. The isolation helps in preventing any contribution from gate-to-drain capacitance of the driver transistor 245A to the capacitance of the capacitor 235A and hence reducing any change in effective feedback capacitance, thereby preventing change in the slew rate. The transistor 240A also can be biased appropriately to prevent the voltage at the drain of the driver transistor 245A from falling below a limit dictated by the gate-oxide reliability of the driver transistor 245A. The transistor 240A can be biased based on the threshold voltage of the transistor 240A, for example at PBIAS (2.2 V—the threshold voltage).

The purpose and functioning of the transistor 270A is similar to that of the transistor 240A.

In some embodiments, the circuit 200 can be used in the UDSM digital complementary metal oxide semiconductor (CMOS) process. The capacitor 235A and the capacitor 260A can tolerate voltages required by the UDSM digital CMOS process. The transistor 280A, the transistor 245A, the driver transistor 245A, the driver transistor 275A, the switch 250A, and the switch 280A can be selected appropriately based on the voltages required by the UDSM digital CMOS process. It is noted that the circuit 200 can be used in different voltage processes. The driver transistors, switches and transistors can be selected based on desired swing at the outputs.

The working of the circuit 200 to generate the negative transition across the load 230A and to generate the positive transition across the load 230B is similar to that of working of the circuit 200 when the circuit 200 generates the positive transition across the load 230A and the negative transition across the load 230B. The driver transistor 205B is active instead of the driver transistor 205A, the biasing circuit 220B is used instead of the biasing circuit 220A, the current element 210b is active instead of the current element 210A, the driver transistor 215B is active instead of the driver transistor 215A, and the biasing circuit 265B is used instead of the biasing circuit 265A. Toggling of D1 from logic HI to logic LO (second control signal) acts as the input (another input).

It is noted that the positive transition across the load 230A and across the load 230B may be congruent or similar based on usage of circuit elements. For example, congruent transitions can be achieved by using same circuit elements in the driver 205A and the driver 205B. Similar approach can be followed for the negative transition across the load 230A and across the load 230B.

The positive transition at one of the two outputs continues till the voltage reaches the power supply value, for example 3.3 V and the negative transition at other one of the two outputs continues till the voltage reaches the ground value, for example 0 V. When the transitions stop at the two outputs, the current flowing through the capacitors, for example the capacitor 235A and the capacitor 260A stops. The voltages at the gate of the driver transistor 245A and the driver transistor 275A start approaching towards each other at a rate and to a level depending on relative effective capacitances on respective gate nodes. The approaching may continue till current through the current element 210A becomes zero making the voltages at the gate of the driver transistor 245A and the driver transistor 275A go beyond predefined ranges, thereby causing degradation of gate-oxide of the driver transistor 245A and the driver transistor 275A. The predefined ranges for the voltages at the gate of the driver transistor 245A and the driver transistor 275A can be defined based on process requirement and threshold voltages of the driver transistor 245A and the driver transistor 275A.

Figure 3:
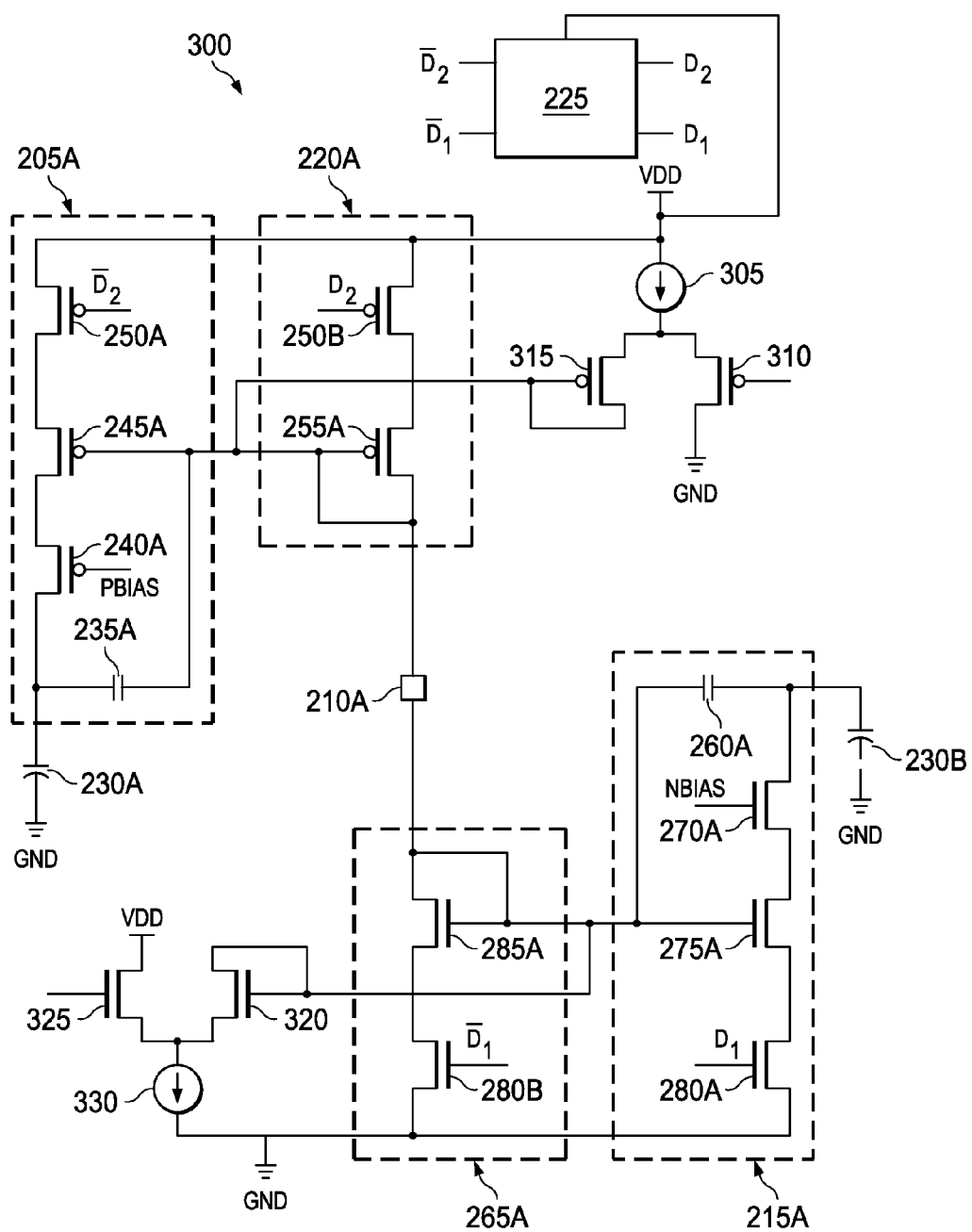
FIG. 3 illustrates a clamp circuit, in accordance with one embodiment.

The clamp circuit used for maintaining the voltages at the gates of the driver transistor 245A and the driver transistor 275A is explained in detail in conjunction with FIG. 3. A similar clamp circuit can also be used for maintaining the voltages at the gates of the driver transistor 245B and the driver transistor 275B.

Referring to FIG. 3, a portion 300 of the circuit 200 including an exemplary clamp circuit is illustrated. The portion 300 includes the driver 205A, the driver 215A, the biasing circuit 220A, the biasing circuit 265A, the load 230A, the load 230B, the current element 210A and the circuit 225. The portion 300 also includes a current source 305, a transistor 310, a diode 315, a diode 320, a transistor 325 and a current sink 330 which together can be referred to as the clamp circuit.

One terminal of the current source 305 is coupled to the power supply and other terminal is coupled to the diode 315 and a source of the transistor 310. The drain of the transistor 310 is coupled to the ground. The diode 315 is coupled to the diode 320 through the current element 210A. The diode 320 is coupled to one terminal of the current sink 330 and a source of the transistor 325. The drain of the transistor 325 is coupled to the power supply. The diode 315 is also coupled to the gate of the driver transistor 245A and the diode 320 is coupled to the gate of the driver transistor 275A.

In some embodiments, a gate of the transistor 310 can be biased at, for example 2.2 V (clamp reference voltage) and a gate of the transistor 325 can be biased at, for example 1.1 V (clamp reference voltage). The biasing voltages can be based on reliability limits of gate-oxide of respective transistors. The biasing voltages and strength of the current elements 210A can determine value of the current source 305. The gate voltage of the driver transistor 245A and the driver transistor 275A, during generation of the transitions, are Vtp+∈p and Vtn+∈n respectively, which are sufficiently away from the clamp reference voltages respectively and hence prevents the clamp circuit from interfering during the transitions at the two outputs. During generation of the transitions, the current in the clamp circuits is diverted through the transistor 310 and the transistor 325. After the generation of the transitions is complete the voltage at the gate of the driver circuit 275A starts rising and the voltage at the gate of the driver transistor 245A starts falling. The clamp circuit then clamps the gates of the driver transistor 245A and the driver transistor 275A to respective clamp reference voltages by providing the current through the current element 210A required to maintain the biasing voltages, for example 1.1V at the gate of the driver transistor 275A and 2.2V at the gate of the driver transistor 245A. The clamp reference voltages can be decided based on transistors available in CMOS technology. The current through the current element Ic in clamped state is $$Ic = \frac{(2.2) - (1.1)}{R} \quad (11)$$

It is noted that various existing clamp circuits can be used.

Figure 4A:
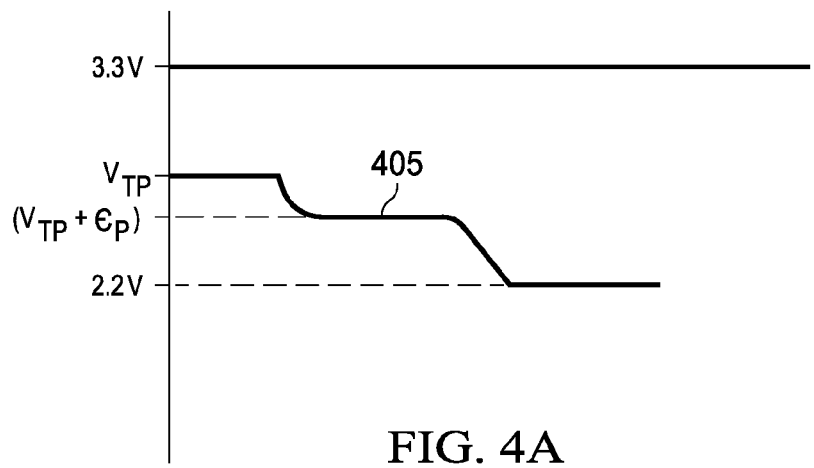
FIG. 4 illustrates an exemplary representation of voltage waveforms at gates of driver transistors, in accordance with one embodiment.
Figure 4B:
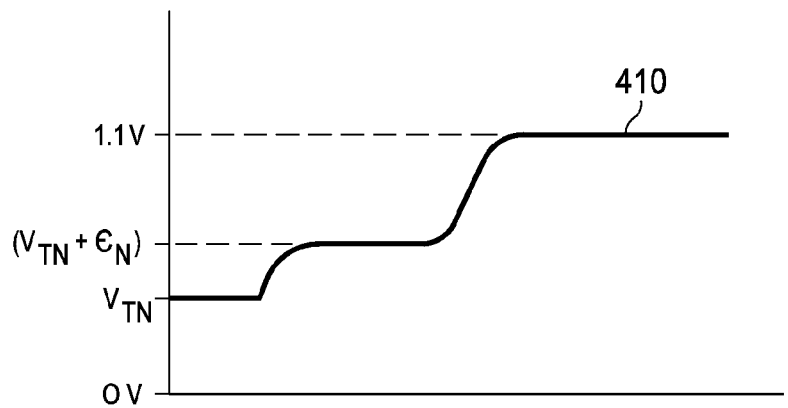

FIG. 4A illustrates an exemplary representation of a voltage waveform 405 at the gate of the driver transistor 245A and FIG. 4B illustrates a voltage waveform 410 at the gate of the driver transistor 275A. The gate of the driver transistor 245A is pre-charged to have the voltage at the gate of the driver transistor 245A equal to the threshold voltage of the driver transistor 245A before the positive transition. The voltage then settles to Vtp+∈p to initiate the positive transition at specific slew rate. The voltage is then clamped at 2.2 V after the positive transition is complete. Similarly, the gate of the driver transistor 275A is pre-charged to have the voltage at the gate of the driver transistor 275A equal to the threshold voltage of the driver transistor 275A before the negative transition. The voltage then settles to Vtn+∈n to initiate the negative transition at the specific slew rate. The voltage is then clamped at 1.1 V after the negative transition is complete.

Figure 5:
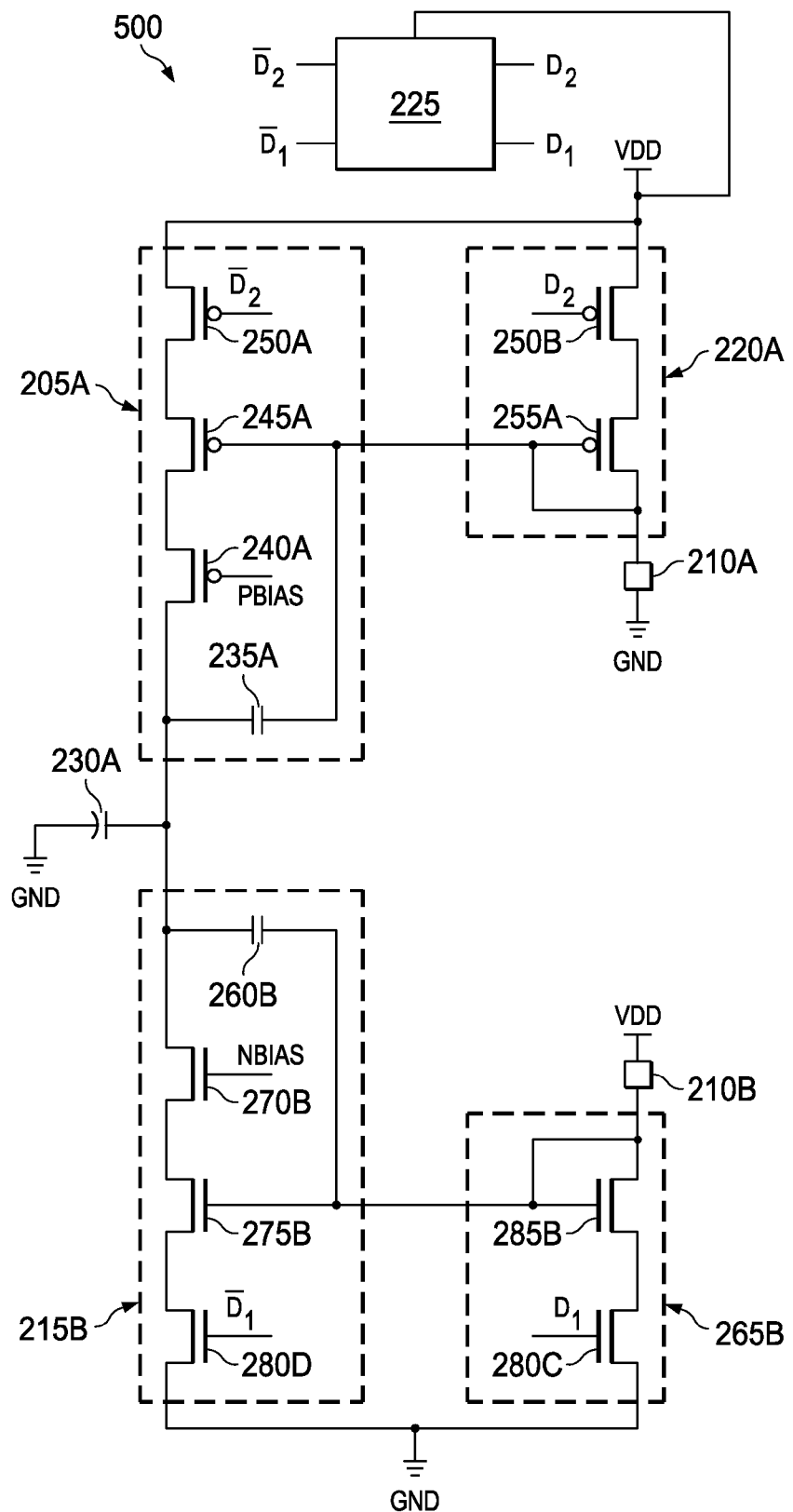
FIG. 5 illustrates a circuit, in accordance with another embodiment.

Referring to FIG. 5, the circuit 500 illustrates a half-portion of the circuit 200. The circuit 500 can be used for generating a transition at an output as a single ended driver or as a pseudo differential driver. Two instances of the circuit 500 can be used to generate the two outputs. The current element 210A can be coupled to the ground and the current element 210B can be coupled to the power supply.

At any point either the driver 205A is active to generate the positive transition or the driver 215B is active to generate the negative transition across the load 230A.

Figure 6:
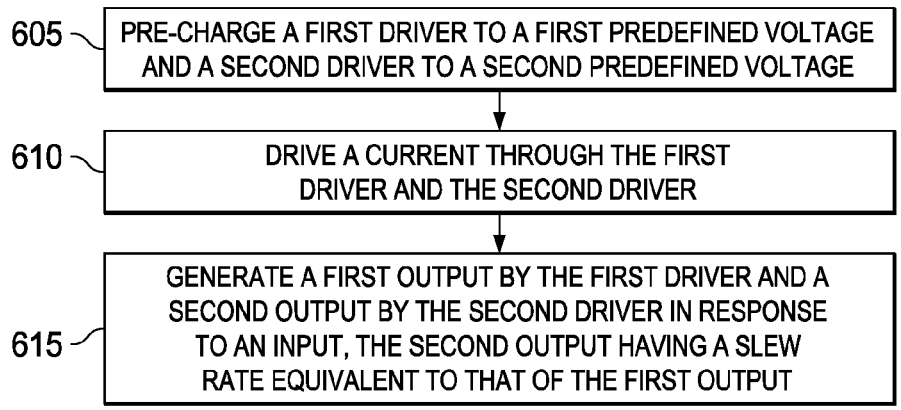
FIG. 6 is a flow diagram illustrating a method for controlling slew rate in a driver circuit, in accordance with one embodiment.

FIG. 6 illustrates a method for controlling slew rate in a driver circuit. The driver circuit includes two drivers, for example a first driver and a second driver.

At step 605, the first driver, for example the positive driver 205A, is pre-charged to a first predefined voltage and the second driver, for example the negative driver 215A, is pre-charged to a second predefined voltage. The first predefined voltage and the second predefined voltage can be threshold voltages of the first driver and the second driver respectively.

At step 610, a current is driven through the first driver and the second driver. The first driver and the second driver are active when the current is driven. By driving the same current through the first driver and the second driver the slew rate is controlled and matched. The same current can be driven by using a current element, for example the current element 210A.

At step 615, a first output is generated by the first driver and a second output is generated by the second driver in response to an input. In some embodiments, the first output and the second output are differential and have similar slew rates. One output among the two outputs includes a positive transition and another output includes a negative transition.

In some embodiments, after the transitions are complete voltages at the gate of the first driver and at the gate of the second driver are maintained within predefined ranges to prevent damage to the first driver and the second driver.

Figure 7:
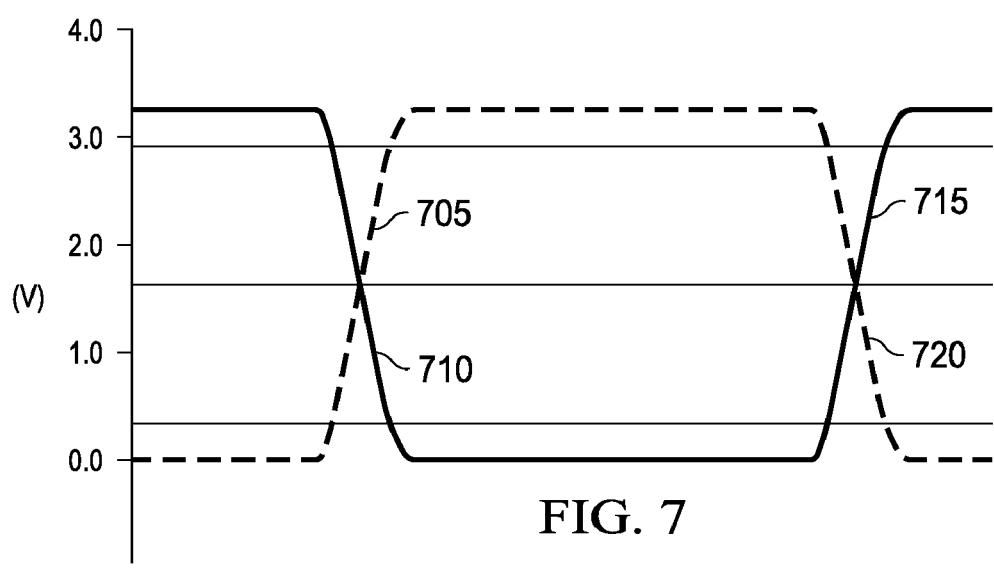
FIG. 7 is an exemplary representation of the two outputs of a circuit, in accordance with one embodiment.

FIG. 7 is an exemplary representation of the two outputs of a driver implemented in 45 nanometers CMOS process, across process and temperature variations. Supply rails correspond to power supply of 3.3 V and ground at 0 V. The cross-over point is around 1.65 V. The slew rates of the positive transition (705) and the negative transitions (710) are controlled and equal. Similarly the slew rates of the positive transition (715) and the negative transitions (720) are controlled and equal.

The cross-coupled circuit helps in achieving similar slew rates at the two outputs. The desired cross-over voltage and desired ratio of the rise time and the fall time can also be achieved due to the cross-coupling in the UDSM process and other processes.

In the foregoing discussion, the term "coupled or connected" refers to either a direct electrical connection between the devices connected or an indirect connection through one or more passive or active intermediary devices. The term "circuit" means at least either a single component or a multiplicity of components, that are connected together to provide a desired function. The term "signal" means at least one current, voltage, charge, data, or other signal.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:

1. A circuit comprising:
   a first positive driver that generates a first positive transition at a first output in response to an input;
   a first negative driver coupled to the first current element, and responsive to the input and the current, due to the first current element, to generate a first negative transition, at a second output, at a rate similar to that of the first positive transition;
   a first current element coupled to the first positive driver and a second negative driver; and
   a second current element coup led to a second positive driver and the first negative driver.

2. The circuit as claimed in claim 1, wherein the circuit is comprised in a universal serial bus driver.

3. A circuit comprising:
   a first positive driver that generates a first positive transition at a first output in response to an input;
   a first current element coupled to the first positive driver to enable generation of a current; and
   a first negative driver coupled to the first current element, and responsive to the input and the current, due to the first current element, to generate a first negative transition, at a second output, at a rate similar to that of the first positive transition
   a second positive driver that is capable of generating a second positive transition at the second output in response to another input;
   a second current element coupled to the second positive driver and that is capable of enabling generation of the current; and
   a second negative driver coupled to the second current element and that is capable of generating a second negative transition at the first output in response to the another input and the current, due to the second current element, at a rate similar to that of the second positive transition.

4. The circuit as claimed in claim 3, wherein
   the first current element is one of
      a resistor, and
      a current source; and
   the second current element is one of
      the resistor, and
      the current source.

5. The circuit as claimed in claim 3, wherein each driver comprises:
   a feedback capacitor coupled to a load;
   a driver transistor coupled to the feedback capacitor and pre-biased at a first predefined voltage; and
   a transistor coupled to the driver transistor in a cascode connection and biased at a second predefined voltage to isolate feedback capacitance of the driver transistor, due to the feedback capacitor, from gate-to-drain capacitance of the driver transistor.

6. The circuit as claimed in claim 5, wherein each driver further comprises:
   a switch coupled to the driver transistor and responsive to a control signal to render the driver transistor to generate a transition at an output.

7. The circuit as claimed in claim 6 and further comprising:
   a biasing circuit coupled to the driver transistor and a power supply, and that pre- biases the driver transistor at the first predefined voltage.

8. The circuit as claimed in claim 7, wherein the biasing circuit comprises:
   a diode coupled to the driver transistor; and
   a switch coupled to the diode to charge gate of the driver transistor to the first predefined voltage.

9. The circuit as claimed in claim 6, wherein
   the transistor is a thick-gate oxide transistor; and
   the driver transistor and the switch are thin-gate oxide transistors.

10. The circuit as claimed in claim 3 and further comprising:
    a clamp circuit coupled to the first positive driver and the first negative driver, and responsive to completion of the first positive transition and of the first negative transition to maintain voltages at a gate of the first positive driver and at a gate of the first negative driver within respective predefined range.

11. The circuit as claimed in claim 3, wherein the circuit is comprised in a universal serial bus driver.

12. A circuit comprising:
    a first positive driver that generates a first positive transition at a first output in response to an input;
    a first current element coupled to the first positive driver to enable generation of a current;
    a first negative driver coupled to the first current element, and responsive to the input and the current, due to the first current element, to generate a first negative transition, at a second output, at a rate similar to that of the first positive transition
    a clamp circuit coupled to the first positive driver and the first negative driver, and responsive to completion of the first positive transition and of the first negative transition to maintain voltages at a gate of the first positive driver and at a gate of the first negative driver within respective predefined range.

13. A circuit comprising:
    a first positive driver that generates a first positive transition at a first output in response to an input;
    a first current element coupled to the first positive driver to enable generation of a current;
    a first negative driver coupled to the first current element, and responsive to the input and the current, due to the first current element, to generate a first negative transition, at a second output, at a rate similar to that of the first positive transition:
    a level-shifter circuit; and a pre-driver circuit, coupled to the level-shifter circuit, that in conjunction with the level-shifter circuit generates a signal to drive at least one of the first and second negative drivers.

14. A driver circuit for generating a transition at an output, the driver circuit comprising:

a first feedback capacitor coupled to a load;
a first driver transistor having gate coupled to the first feedback capacitor and pre-biased at a first predefined voltage to control slew rate at the output at start of a first transition in response to a first input;
a first transistor coupled between the first feedback capacitor and drain of the first driver transistor in a cascode connection and biased at a second predefined voltage to isolate a first feedback capacitance of the first driver transistor, due to the first feedback capacitor, from gate-to-drain capacitance of the first driver transistor and to prevent voltage at a drain of the first driver transistor from exceeding a first predefined value;
a first switch coupled to source of the first driver transistor and responsive to a first control signal to render the first driver transistor to generate the first transition at the output;
a second feedback capacitor coupled to the load;
a second driver transistor having gate coupled to the second feedback capacitor and biased at a third predefined voltage to control slew rate at the output at start of a second transition in response to a second input;
a second transistor coupled between the second feedback capacitor and drain of the second driver transistor in a cascode connection and biased at a fourth predefined voltage to isolate a second feedback capacitance of the second driver transistor, due to the second feedback capacitor, from gate-to-drain capacitance of the second driver transistor and to prevent voltage at a drain of the second driver transistor from exceeding a second predefined value; and
a second switch coupled to source of the second driver transistor and responsive to a second control signal to render the second driver transistor to generate the second transition at the output.

15. The driver circuit as claimed in claim 14, wherein each driver transistor, each transistor and each switch is one of:
a positive metal oxide semiconductor (PMOS) type transistor; and
a negative metal oxide semiconductor (NMOS) type transistor.

16. The driver circuit as claimed in claim 14, wherein
the first transition comprises one of a positive transition and a negative transition; and
the second transition comprises one of the positive transition and the negative transition,
the first transition and the second transition being opposite to each other.

17. The driver circuit as claimed in claim 14 and further comprising:
a first biasing circuit coupled to the first driver transistor and that biases the first driver transistor at the first predefined voltage; and
a first current element coupled to the first biasing circuit to enable generation of a first current flowing through the first feedback capacitor.

18. The driver circuit as claimed in claim 17 and further comprising:
a second biasing circuit coupled to the second driver transistor that is capable of biasing the second driver transistor at the second predefined voltage; and
a second current element coupled to the second biasing circuit that is capable of enabling generation of a second current that can flow through the second feedback capacitor.

19. The driver circuit as claimed in claim 14, wherein two instances of the driver circuit, one instance generating a positive transition and another instance generating a negative transition simultaneously forms a pseudo-differential driver.

20. A method for controlling slew rate in a driver circuit, the method comprising:
pre-charging a first driver to a first predefined voltage and a second driver to a second predefined voltage, wherein the first driver and second driver are cross coupled through a current element;
driving a current through the first driver and the second driver; and
generating a first output, by the first driver, and a second output, by the second driver, in response to an input, the second output having a slew rate equivalent to that of the first output.

21. The method as claimed in claim 20 and further comprising:
maintaining voltages at a gate of the first driver and at a gate of the second driver within respective predefined ranges.

* * * * *